3,429,842
POLISH FORMULATION
Richard L. Wolstoncroft, Erie, N.Y., assignor to Union Carbide Corporation, a corporation of New York
No Drawing. Filed Dec. 9, 1964, Ser. No. 417,232
U.S. Cl. 260—28.5          4 Claims
Int. Cl. C09g 1/10

ABSTRACT OF THE DISCLOSURE

An aqueous polish formulation containing an emulsifiable polyolefin wax, an acrylic interpolymer, an alkali-soluble resin and a leveling agent containing tributoxyethyl phosphate, a hydrolytically stable polysiloxane-oxyalkylene block copolymer and diethylene glycol monoethyl ether.

---

This invention relates to polish formulations. More particularly, this invention relates to emulsion-type polish formulations.

Typical polish formulations of this type comprise a wax at least part of which is carnauba wax, a solid resinous material, an organic acid, and an emulsifier. Upon application to a surface the polish dries to a shine without rubbing and buffing, and thus such polishes are favored by the consumers. In order to get the optimum performance from such formulations it is important to minimize, and preferably obviate, the beading of the polish as it is applied to a surface, i.e., to promote the "leveling" of the polish so as to assure a uniform film of polish on the surface.

When synthetic waxes such as emulsifiable polyolefin waxes, for example, are employed in the polish formulations in combination with acrylic polymers the leveling problems become quite acute. Nevertheless these waxes are very desirable from the standpoint of durability, buffability, and scuff-resistance.

Adequate leveling in such instances is usually obtained by the addition of plasticizers and certain leveling agents such as dibutylphthalate, tributoxyethylphosphate, and morpholine oleate for example. However, since the aforementioned additives are non-volatile liquids, the resulting polish formulations are often unsatisfactory as to their smearing, scuffing, and dirk pick-up characteristics.

It is the principal object of this invention to provide a polish formulation containing a combination of synthetic wax and an acrylic polymer latex and having very good leveling properties.

It is a further object to provide a polish formulation exhibiting good buffability, durability and scuff-resistance.

Still other objects will readily present themselves to the skilled artisan upon reference to the ensuing specification and the claims.

The objects of this invention are achieved by a polish formulation which is an aqueous non-ionic dispersion of an emulsifiable polyolefin wax, an acrylic interpolymer, an alkali-soluble resin, and a leveling agent consisting of from about 8.5 to about 12.7 parts by weight tributoxyethyl phosphate, from about 0.6 to about 1.0 part by weight a hydrolytically-stable polysiloxane-oxalkylene block copolymer having a molecular weight below about 25,000 and a polysiloxane content in the range from about 30 to about 60 percent by weight of the block copolymer and from about 5.29 to about 10.6 parts by weight diethylene glycol monoethyl ether, based on 100 parts total of polyolefin wax plus acrylic interpolymer.

The principal constituents of the polish film deposited on a surface are the emulsifiable polyolefin wax and the acrylic interpolymer. The combined amounts of these two constituents in the formulation can range from about 7 to about 18 parts per 100 by weight. The weight ratio of the wax to the acrylic interpolymer can vary from about 9:1 to 1:9 depending on the desired ultimate hardness of the deposited protective film. The more acrylic interpolymer is present, the harder will be the film.

The term "emulsifiable polyolefin wax" as used herein and in the appended claims refers to a low molecular weight olefin polymer having sufficient polarity to the polymer chain so as to be emulsifiable in water to form stable emulsions. Emulsification can result either from cold or hot techniques, and normally the latter are preferred. The temperature of water during the emulsification preferably is high enough to exceed the melting point of the polyolefin. In other words, the polymer should be in a molten or softened state in order for it to be dispersed into and form the stable aqueous emulsion.

Any polyolefin can be used to form these emulsifiable polymers. Particularly desirable, however, are the homopolymers and copolymers of simple olefins such as ethylene, propylene and butene-1. Also, the copolymers of such olefins with unsaturated monomers containing the ethylene linkage ($>C=C<$) such as ethyl acrylate, styrene, bicycloheptene, vinyl acetate and acrylic acid provide the most durable floor polishes. The harder and more crystaline homopolymers of ethylene and propylene are preferred. With the ethylene homopolymers the preferred polymers range in density from about 0.94 to 0.98 with crystalline melting point from about 115° to 140° C. Other commercially available waxes having densities from about 0.915 to 0.94 and melting point from about 105° to 120° C. can, of course, be used but are less hard and do not provide the durability and wear quality of the harder waxes.

Normally the number average molecular weight for the emulsifiable polyolefin waxes will be in the range from about 1000 to about 10,000 as determined by either the boiling point or freezing point technique, and preferably having a high melting point, ie., of about 115° C. to 140° C. They may be obtained in this molecular weight either by direct polymerization or by pyrolysis of a higher molecular weight polyolefin.

This latter technique is preferred since the pyrolysis of the higher polymers creates terminal vinyl unsaturation which is readily available for reaction with an ethylenically unsaturated polar monomer like maleic anhydride or thioglycolic acid, as in the manner taught by U.S. Patents 2,766,214 and 3,144,348. Another valuable technique for forming emulsifiable polymers by creation of sufficient polarity is by oxidation with or without a catalyst to create pendant carboxyl groups on the polymer chain along with ketones, aldehyde and hydroxyl groups with care to prevent or minimize odor, color, and gelation. Other emulsifiable polymers are the block copolymers formed by reacting ethylene oxide with polyethylene to get hydroxyl terminated polymers as taught in U.S. Patent 2,921,920. Also emulsifiable are the ethylene alcohol telomers reacted with maleic acid as taught by U.S. Patent 2,766,214, as well as the graft copolymers of polyolefin with comonomers such as acrylic and methacrylic acids such as taught by U.S. Patent 2,970,129. In addition, the direct polymerization to and/or hydrolysis of the olefin copolymers mentioned above can impart the necessary amount of polarity to the polymer chain to make the emulsion stable.

Thus as is seen many ways are known and are available for making the emulsifiable polymer waxes. The above listing is intended illustrating only and is not intended to be in any way exclusive or limiting, for obviously other methods for making such waxes can occur to those skilled in the art.

In a typical preferred method, a polyethylene wax having a density of about .94, or above, is pyrolyzed to a molecular weight of from about 1000 to about 5000 and blended while in a liquid phase, i.e., as a melt or in a solution, with from about 1 to about 5 percent by weight maleic anhydride. The maleic anhydride is usually added gradually so as to keep the formulation from darkening. The resulting blend is agitated and heated to a temperature in the range from about 130° C. to about 250° C., and preferably above about 180° C. The particular temperature is dependent on the density of the polyethylene and increases as the density of the polyethylene increases. With lower density polyethylenes temperatures as low as 80° C. are satisfactory. It is important, however, that the resulting mixture be agitated during heating so as to insure favorable reaction conditions for the reaction between the polyethylene and the maleic anhydride.

The mixing and agitation can be carried out in any manner which insures intimate co-mingling of the reactants and good heat transfer throguhout the reaction mass. In order to aid blending and agitation, the polyethylene wax can be dissolved in an inert liquid organic solvent for both the wax and the acid anhydride. Typical solvents are the liquid hydrocarbons such as toluene, xylene, cyclohexane, iso-octane, and the like, and also the halogenated liquid hydrocarbons such as o-dichlorobenzene, 1,1,2-trichloroethane, alpha-chloronaphthalene, and the like. The dissolution of the higher density polyethylene waxes is most conveniently accomplished at temperatures above about 110° C. and in aromatic solvents.

The acrylic interpolymers suitable for use in the present formulations are composed predominantly of polymerized acrylate esters and preferably those containing from 4 to 6 carbon atoms inclusive, such as methyl methacrylate, ethyl methacrylate, methyl acrylate, ethyl acrylate, and similar esters interpolymerized with smaller amounts of other ethylenically unsaturated monomers, such as styrene and/or acrylonitrile, acrylic acid, and the like, in an emulsion system to high molecular weight polymers. It has been observed with these acrylic interpolymer emulsions that a wide range of properties can be secured by varying the monomers and their concentration. For example, ethyl acrylate improves toughness whereas methyl methacrylate improves hardness, as does acrylonitrile and styrene interpolymerized therewith. Acrylic acid, generally 10% by weight or less, will substantially aid emulsifiability of the wax made therefrom. The preferred interpolymers contain from about 50 to about 85% by weight of the acrylate esters and the balance selected from the other modifying monomers mentioned above. The particular choice of the monomers and their amounts used to secure the desired properties in the final polish product are well within the skill of those familiar with the art. Suitable acrylic interpolymers are commercially available from many suppliers. Typical such interpolymers are Ubatol U–3400 supplied by the UBS Chemical Company which is an interpolymer of about 65% by weight ethyl acrylate, about 25% by weight acrylonitrile, and about 10% by weight styrene in an aqueous emulsion, as well as the acrylate emulsion AA–409 supplied by Morton Chemical Company.

The polymerization of the acrylic interpolymers can be accomplished by adding the desired monomer mixture to a water-emulsifier-catalyst system and forming an emulsion with agitation. The catalysts are usually of the redox or free radical types and polymerization is induced by heating, preferably to a temperature in the range of about 40° C. to 80° C. Emulsifiers which can be employed are not critical and can be either of the anionic or non-ionic types.

The ultimate latex which is to be compounded into the polish formulations of this invention should have a maximum particle size of about 0.06 micron. A particle size of from about 0.03 micron to about 0.05 micron is preferred in order to assure good leveling properties in the final polish formulation. The refractive index of the acrylic interpolymer latex should be in the range from about 1.47 to about 1.59.

The alkali soluble resin present in the formulation serves to facilitate the eventual removal of an applied polish film. Such resins are insoluble in water but are soluble in basic aqueous solutions such as an ammonia solution, an alkali metal hydroxide solution, or the like. A common material employed for this purpose in polish formulations is rosin modified with alcohol or acid treatments which alter the nuclear configuration of the rosin acids. The thus obtained product is usually a mixture of esterified rosin and rosin acids. Also suitable alkali-soluble resins for the purposes of the present formulations are shellac, casein, phenolformaldehyde resins, maelic acid adducts of styrene or methacrylate, and the like.

A prominent part in the instant formulations is played by the leveling agent. It has been found that not only the constituents but also the relative amounts thereof are critical in order to achieve optimum leveling. Thus, the amount of tributoxethyl phosphate can vary from about 8.5 to about 12.7 parts by weight, and preferably should be in the range from about 9.5 to about 11.6 parts by weight per 100 parts total polyolefin wax plus acrylic interpolymer.

Similarly, the diethylene glycol monoethyl ether can be present in the formulation in an amount in the range from about 5.29 to about 10.6 parts by weight, and preferably from about 5.29 parts by weight to about 6.35 parts by weight per 100 parts total polyolefin wax plus acrylic interpolymer. While substantially pure diethylene glycol monoethyl ether is preferred for the purpose of the present invention, it can also contain up to about 25 percent by weight of ethylene glycol, a common byproduct in the manufacture of diethylene glycol monoethyl ether.

The third constituent of the leveling agent is a hydrolytically-stable polysiloxane-oxyalkylene block copolymer having a molecular weight below about 25,000. This copolymer can be present in an amount in the range from about 0.6 to about 1.0 part by weight, and preferably from about 0.74 to about 0.95 part by weight per 100 parts total polyolefin wax plus acrylic interpolymer.

The polysiloxane content in the aforesaid polysiloxane-oxyalkylene block copolymers that are suitable for the instant formulations is the range from about 30 percent by weight to about 60 percent by weight of the block copolymer. Copolymers containing less than about 30 percent polysiloxane are water-soluble and thus unsuitable. If the polysiloxane content is greater than about 60 percent by weight, the presence of the copolymer in the formulation results in the crazing of the deposited wax film once it is dry.

The block copolymers contain at least two siloxane units that are represented by the formula

wherein R can be a monovalent hydrocarbon group, a halo-substituted monovalent hydrocarbon group, or a divalent hydrocarbon group, and $b$ is an integer in the range from 1 to 3. Each R can contain from about one to about twenty carbon atoms. The hydrocarbon groups represented by R can be alike or different throughout the siloxane block of the polymer and, similarly, the value of $b$ can be the same or different. The divalent hydrocarbon groups represented by R link the siloxane block to the oxyalkylene block present in the copolymer. Each siloxane block contains at least one unit represented by the above formula having a divalent hydrocarbon group.

Illustrative of the monovalent hydrocarbon groups that are present in the above formula are the alkenyl groups (for example, the vinyl group and the allyl group); the cycloalkenyl groups (for example, the cyclohexenyl group); the alkyl groups (for example, the methyl, ethyl, isopropyl, octyl, dodecyl, octadecyl and eicosyl groups); the aryl groups (for example, the phenyl, naphthyl and terphenyl groups); the aralkyl groups (for example, the benzyl and the phenylethyl groups); the alkaryl groups (for example, the styryl, tolyl and n-hexylphenyl groups); and the cycloalkyl groups (for example, the cyclohexyl group).

Illustrative of the halogen-substituted monovalent hydrocarbon groups are the chloromethyl, trichloroethyl, perfluorovinyl, parabromobenzyl, iodophenyl, alpha-chloro-beta-phenylethyl, para-chlorotolyl, bromocyclohexyl, and the like.

Illustrative divalent hydrocarbon groups are the alkylene groups (such as the methylene, ethylene, propylene, butylene, 2,2-methyl-1,3-propylene, decylene and eicoxylene groups), the arylene groups (such as the phenylethylene group). Preferably, the divalent hydrocarbon group is an alkylene group containing from two to four successive carbon atoms. Siloxane groups containing divalent hydrocarbon groups as substituents are illustrated by groups having the formulae:

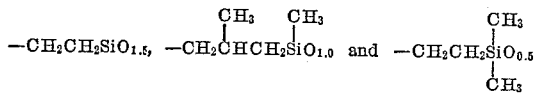

These divalent hydrocarbon groups are linked to a silicon atom of the siloxane block by a silicon-to-carbon bond and to an oxygen atom of the oxyalkylene block by a carbon-to-oxygen bond.

The siloxane block can contain siloxane units that are represented by the above formula wherein either the same hydrocarbon groups are attached to a silicon atom (e.g., the dimethylsiloxy, diphenylsiloxy and diethylsiloxy groups) or different hydrocarbon groups are attached to a silicon atom (e.g., the methylphenylsiloxy, phenylethylmethylsiloxy and ethylvinylsiloxy groups).

The siloxane block in the block copolymers useful in this invention can contain one or more types of siloxane units that are represented by the aforesaid formula provided that at least one group has at least one divalent hydrocarbon substituent. By way of illustration, ethylenemethylsiloxy groups

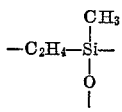

can be present in the siloxane block, or the siloxane block can contain more than one type of siloxane group, e.g., the block can contain both ethylene methylsiloxy groups and diphenylsiloxy group, or the block can contain ethylenemethylsiloxy groups, diphenylsiloxy groups and diethylsiloxy groups.

The siloxane block contained in the block copolymers useful in this invention can also contain trifunctional siloxane units (e.g., monomethylsiloxane groups, $CH_3SiO_{1.5}$), difunctional siloxane groups [e.g., dimethylsiloxane groups, $(CH_3)_2SiO_{1.5}$], monofunctional siloxane units [e.g., trimethyl siloxane units, $(CH_3)_3SiO_{0.5}$], or combinations of these types of silane units having the same or different substituents. Due to the functionality of the siloxane groups, the siloxane block can be predominately linear or cyclic or crosslinked or it can have combinations of these structures.

The siloxane block contained in the block copolymers can also contain other end-blocking or chain terminating groups as well as the mono-functional siloxane chain terminating groups. By way of illustration, the siloxane block can contain such end-blocking groups as the hydroxyl group, the aryloxy groups (such as the phenoxy group), the alkoxy groups (such as the methoxy, ethoxy, propoxy, and butoxy groups), the acyloxy groups such as the acetoxy group, and the like.

The siloxane blocks in the block copolymers useful in this invention each contain at least two siloxane units. Preferably, the siloxane blocks contain a total of at least five siloxane units of the type shown above. That part of the average molecular weight of the copolymer that is attributable to the siloxane blocks can be as high as about 10,000.

The oxyalkylene blocks in the block copolymers useful in the present formulations each contain at least one oxyalkylene group represented by the formula

—R″—O— wherein R″ is an alkylene group. Preferably, the alkylene group represented by R″ contains from two to about ten carbon atoms, and most preferably from two to three carbon atoms. Illustrative oxyalkylene groups are the oxyethylene, oxy-1,2-propylene, oxy-1,3-propylene, oxy-2,2-dimethyl-1,3-propylene, oxy-1,10-decylene groups, and the like.

The oxyalkylene blocks in the block copolymer can contain one or more of the various types of oxyalkylene groups hereinabove represented. By way of illustration, the oxy-alkylene blocks can contain only oxyethylene groups or only oxypropylene groups, or both oxypropylene groups and oxy-ethylene groups, or other combinations of the various types of oxyalkylene groups.

The oxyalkylene blocks in the block copolymers useful in this invention can contain organic end-blocking or chain terminating groups. By way of illustration, the oxyalkylene blocks can contain such end-blocking groups as the hydroxy group, the aryloxy group (such as the phenoxy group), the alkoxy groups (such as the methoxy, ethoxy, propoxy and butoxy groups), alkenyloxy groups (such as the vinyloxy and and allyloxy groups). Also a single group can serve as an end-blocking group for more than one oxyalkylene block. For example, the glyceroxy group

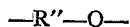

can serve as an end-blocking group for three oxyalkylene chains.

The oxyalkylene blocks in the block copolymers contemplated herein each contain at least one oxyalkylene group. Preferably, each block contains at least two such groups. That part of the average molecular weight of the copolymer that is attributable to the oxyalkylene blocks can be as high as about 15,000.

The copolymer can contain, for example, from about 30 parts by weight up to about 60 parts by weight of siloxane blocks and from about 40 parts by weight to about 70 parts by weight of oxyalkylene block per 100 parts by weight of the copolymer. Preferably, the copolymer contains from about 35 parts by weight to about 50 parts by weight of the siloxane blocks and from about 50 parts by weight to about 65 parts by weight of the oxyalkylene blocks per 100 parts by weight of the copolymer.

The block copolymers useful in this invention can contain more than one of each of the blocks and the blocks can be arranged in various configurations such as linear, cyclic or branched configurations.

Illustrative blocks copolymers within the purview of the foregoing description are:

$Me_3SiO(Me_2SiO)_{2.0}[MeO(C_2H_4O)_3C_3H_6SiMeO]_{2.8}SiMe_3$ (A)

$Me_3SiO(Me_2SiO)_{2.0}[MeO(C_2H_4O)_3C_2H_4SiMeO]_{2.8}SiMe_3$ (B)

$Me_3SiO(Me_2SiO)_{8.5}[MeO(C_2H_4O)_7C_3H_6SiMeO]_{1.8}$
$[MeO(C_2H_4O)_3C_3H_6SiMeO]_{1.8}SiMe_3$ (C)

$Me_3SiO[MeO(C_2H_4O)_3C_3H_6SiMeO]_2SiMe_3$ (D)

Note: In the above formula $Me=CH_3$—

The polysiloxane-oxyalkylene block copolymers that are useful in the instant formulations can be prepared by two convenient methods. The first method, known as the metathesis process, involves forming a mixture of a siloxane polymer containing a silicon-bonded, halogen-substituted monovalent hydrocarbon group and an alkali metal salt of an oxyalkylene polymer and heating the mixture to a temperature sufficiently elevated to cause the siloxane polymer and the salt to react to produce the copolymer. This process is illustrated by the following equation:

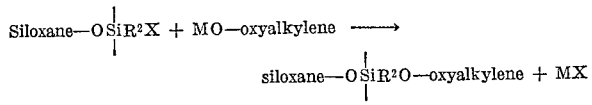

$$\text{Siloxane}-\text{OSiR}^2\text{X} + \text{MO}-\text{oxyalkylene} \longrightarrow$$
$$\text{siloxane}-\text{OSiR}^2\text{O}-\text{oxyalkylene} + \text{MX}$$

wherein $R^2$ is a divalent hydrocarbon group, X is a halogen atom, M is an alkali metal, siloxane denotes a siloxane block and oxyalkylene denotes an oxyalkylene block.

The second method, known as the addition process, involves forming a mixture of a siloxane polymer containing a hydrogen-siloxy group

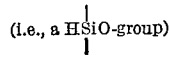

(i.e., a HSiO-group)

an oxyalkylene polymer containing an alkenyloxy endblocking or chain terminating group and a platinum catalyst, heating the mixture to a temperature sufficiently elevated to cause the siloxane polymer and the oxyalkylene polymer to react to produce the copolymer. This process can be illustrated by the following equation:

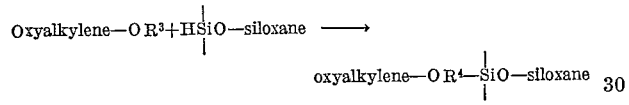

$$\text{Oxyalkylene}-\text{OR}^3 + \text{HSiO}-\text{siloxane} \longrightarrow$$
$$\text{oxyalkylene}-\text{OR}^4-\text{SiO}-\text{siloxane}$$

wherein oxyalkylene and siloxane have the same meaning as that defined in the formula immediately preceding, $OR^3$ is an alkenyloxy group (such as the vinyloxy and the allyloxy groups) and $R^4$ is an alkylene group containing at least two successive carbon atoms.

The herein contemplated formulations are compounded by admixing aqueous dispersions of the wax, the acrylic interpolymer, and the alkali-soluble resin, with the aforedescribed leveling agent composition in any convenient manner. Thereafter additional amounts of water can be added to adjust the solids content of the resulting formulations to a desired value. The solids content of the polish formulations usually ranges from about 8 to about 20 percent by weight.

Dispersions of the emulsifiable polyolefin wax can be conveniently prepared using inversion emulsification techniques under superatmospheric pressure. In general, the dispersion or emulsification process comprises admixing the wax, a non-ionic emulsifying agent, and water at room temperature, and thereafter heating the resulting mixture in a pressure vessel up to at least autogenous pressure, or above, stirring the mixture during heating, admixing additional amounts of water to achieve the desired solids content, and then cooling the resulting dispersion.

The non-ionic emulsifiers contemplated herein are organic compounds of a relatively high molecular weight and consisting of a hydrophobic portion to which is attached a solubilizing or hydrophilic portion containing groups such as ether links (—C—O—C—), hydroxyl groups (—OH), carbonyloxy groups

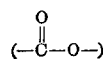

$$\begin{matrix} \text{O} \\ \parallel \\ (-\text{C}-\text{O}-) \end{matrix}$$

and the like.

Specifically contemplated within the above definition are surfactants having as the hydrophilic moiety one or more chains containing one or more alkyleneoxy groups. These surfactants have the general formula

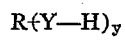

$$R(Y-H)_y$$

wherein R is the hydrophobic portion of an aliphatic alcohol containing from about 8 to about 22 carbon atoms or an alkylated phenol containing from about 4 to about 22 carbon atoms in the alkyl group thereof, Y is an alkyleneoxy chain, H is a hydrogen atom bonded to an oxygen atom of the alkyleneoxy chain, and $y$ is an integer from 1 to about 6, and preferably from 1 to 4.

Typical aliphatic alcohols are octyl alcohol, nonyl alcohol, decyl alcohol, "coco" alcohol (a mixture of $C_{10}$ to $C_{16}$ alcohols), dodecyl alcohol, oleyl alcohol, tallow alcohol (a mixture of $C_{16}$ to $C_{18}$ alcohols), octadecyl alcohol, 2,6,8-trimethyl-4-nonyl alcohol, and the like.

Typical alkylated phenols are butylphenol, pentylphenol, hexylphenol, octylphenol, nonylphenol, dodecylphenol, hexadecylphenol, octadecylphenol, nonadecylphenol, and the like.

By the term "alkyleneoxy chain" as used herein is meant a chain containing one or more alkyleneoxy groups which are divalent alkylene groups such as methylene, ethylene, propylene, butylene, and the like, bonded to an oxygen atom in a manner such that one of the valences of the alkyleneoxy group is from an oxygen atom and the other is from a carbon atom. Typical alkyleneoxy groups are methyleneoxy (—$CH_2O$—), ethyleneoxy $$(-C_2H_4O-)$$

propyleneoxy (—$C_3H_6O$—), butyleneoxy (—$C_4H_8O$—), and the like.

Preferred non-ionic surfactants for the instant formulations are the polyalkylene glycol ethers containing from about 4 to about 80 moles of alkylene oxide. Illustrative preferred non-ionic surfactants are the nonylphenyl polyethylene glycol ethers containing about 4 moles of ethylene oxide, the trimethylnonyl polyethylene glycol ethers containing about 6 moles ethylene oxide, the nonylphenyl polyethylene glycol ethers containing about 7 moles of ethylene oxide, mixed polyalkylene glycol ethers containing about 60 mols of a mixture of ethylene oxide and 1,2-propylene oxide in a mole ratio of about 2:1, and the like.

The alkali soluble resin may be employed in the range of about 7.4 to 10.6 parts by weight per 100 parts total polyolefin wax plus acrylic interpolymer. Less than about 7.4 parts does not impart sufficient removability and more than about 10.6 percent makes the polish too prone to water spotting.

EXAMPLE I

A starting formula was prepared by blending with vigorous stirring the following:

(I) 50 parts of a non-ionic aqueous emulsion of a polyethylene wax containing 13.5% by weight solids. The polyethylene wax was the maleic anhydride adduct of a pyrolized polymer having a molecular weight of 5000.

(II) 43 parts of an anionic emulsion of acrylic interpolymer based on about 65 percent by weight ethyl acrylate, 25 percent by weight acrylonitrile and about 10 percent by weight styrene. The acrylic interpolymer emulsion as originally obtained contained 40 weight percent solids and was diluted to 13.5 weight percent solids for the preparation of this starting formula.

(III) 7 parts of an aqueous ammonia solution of an alkali soluble resin. The solution containing 13.5 weight percent solids.

To a quantity of the above starting formula containing 100 parts by weight total of emulsifiable polyolefin wax and acrylic interpolymer were added the following parts of the leveling agent components while stirring:

| Leveling component | Product | |
|---|---|---|
| | A | B |
| Diethylene glycol monoethyl ether | 4.1 | 8.1 |
| Tributoxyethyl phosphate | 4.1 | 8.2 |
| Silicone [1] | .82 | .41 |

[1] $(CH_3)_3SiO[(CH_3)_2SiO]_2[CH_3(OC_2H_4)_3OC_3H_6SiCH_3O]_{2.8}Si(CH_3)_3$

EXAMPLE II

A preferred formula was prepared by blending the following ingredients with stirring:

(I) 45 parts of the same non-ionic emulsion of polyolefin wax of Example I, diluted to 10.5 weight percent solids.

(II) 45 parts of the same anionic emulsion of acrylic interpolymer of Example I, diluted to 10.5 weight percent solids.

(III) 7 parts of an aqueous ammonia solution of an alkali soluble resin containing 10.5 weight percent solids.

To the above formula were added the following leveling agent components in the indicated parts by weight per 100 parts by weight total solids of polyolefin wax and acrylic interpolymer.

| Leveling component: | Product |
|---|---|
| Diethylene glycol monoethyl ether | 5.3 |
| Tributoxyethyl phosphate | 10.5 |
| Silicone [1] | .85 |

[1] $(CH_3)_3SiO[(CH_3)_2SiO]_2[CH_3(OC_2H_4)_3OC_3H_6SiCH_3O]_{2.8}Si(CH_3)_3$

Products A and B of Example I and the product of Example II were compared in the following test. They were each applied with a lintless cellulose applicator to black vinyl floor tile and allowed to air dry. After about 1 hour's drying time the wax films were evaluated visually for leveling. Additionally they were tested for water spotting by putting 2 drops of water on each test tile and after about 15 minutes one of the water drops was dried by blotting; the other allowed to completely air dry.

The above tests were recorded as negative quality points on a 1 to 5 scale, 1 being best and 5 being worst as shown in the table below:

TABLE

| | Product (according to preparation) | | |
|---|---|---|---|
| | IA | IB | II |
| Leveling | 3 | 3 | 1 |
| Water spotting | 5 | 2 | 1 |

From the above tests it is evident that Product IA was deficient in both leveling and water spotting while Product IB was considerably improved in water spotting but still deficient in leveling. Product II was excellent from both standpoints. These product tests were particularly valuable in determining the essential concentrations of the leveling agent components needed.

I claim:
1. A polish formulation which is an aqueous non-ionic dispersion consisting essentially of about 100 parts by weight of an emulsifiable polyolefin wax and of an acrylic interpolymer; an alkali-soluble resin; and a leveling agent consisting of from about 8.5 to about 12.7 parts by weight tributoxyethyl phosphate, from about 0.6 to about 1.0 part by weight of a hydrolytically-stable polysiloxane-oxyalkylene copolymer having a siloxane portion containing at least two siloxane units, an oxyalkylene portion containing at least one oxyalkylene unit, a molecular weight below about 25,000 and a polysiloxane content in the range from about 30 to about 60 percent by weight of the copolymer, and from about 5.29 to about 10.6 parts by weight diethylene glycol monoethyl ether.

2. A polish formulation which is an aqueous non-ionic dispersion consisting essentially of about 100 parts by weight of an emulsifiable polyolefin wax and an acrylic interpolymer both present in a weight ratio of from about 1:9 to 9:1, respectively; from about 7.4 to about 10.6 parts by weight an alkali-soluble resin; from about 8.5 to about 12.7 parts by weight tributoxyethyl phosphate, from about 0.6 to about 1.0 part by weight, a hydrolytically-stable polysiloxane-oxyalkylene copolymer having a siloxane portion containing at least two siloxane units, an oxyalkylene portion containing at least one oxyalkylene unit, a molecular weight below about 25,000 and a polysiloxane content in the range from about 30 to about 60 percent by weight of the copolymer, and from about 5.29 to about 10.6 by weight diethylene glycol monoethyl ether.

3. A polish formulation which is an aqueous non-ionic dispersion consisting essentially of about 100 parts by weight of an emulsifiable polyolefin wax and an acrylic interpolymer both present in a weight ratio of from about 1:9 to 9:1, respectively; from about 7.4 to about 10.6 parts by weight an alkali-soluble resin, from about 9.5 to about 11.6 parts by weight tributoxyethyl phosphate, from about 0.74 to about 0.95 part by weight a hydrolytically-stable polysiloxane-oxyalkylene block copolymer having a siloxane portion containing at least two siloxane units, an oxyalkylene portion containing at least two oxyalkylene units, a molecular weight below about 25,000 and a polysiloxane content in the range from about 30 to about 60 percent by weight of the block copolymer, and from about 5.29 to about 6.35 parts by weight diethylene glycol monoethyl ether.

4. A polish formulation which is an aqueous, non-ionic dispersion consisting essentially of about 50 parts by weight maleic anhydride-modified polyethylene wax; about 50 parts by weight an acrylic interpolymer; about 7.8 parts by weight an alkali-soluble resin; about 10.5 parts by weight tributoxyethyl phosphate; about 0.85 part by weight a dimethylsilicone-polyoxyethylene copolymer having the structural formula $(CH_3)_3SiO[(CH_3)_2SiO]_2[CH_3(OC_2H_4)_3OC_3H_6SiCH_3O]_{2.8}Si(CH_3)_3$ and about 5.3 parts by weight diethylene glycol monoethyl ether.

References Cited

UNITED STATES PATENTS

| 2,804,440 | 8/1957 | Brown | 260—825 |
| 3,247,141 | 4/1966 | Stryker et al. | 260—285 |
| 3,305,504 | 2/1967 | Huntington | 260—285 |

MORRIS LIEBMAN, Primary Examiner.

S. L. FOX, Assistant Examiner.

U.S. Cl. X.R.

106—6